M. R. KENYON.
Loom for Weaving Hair-Cloth.
No. 197,732. Patented Dec. 4, 1877.

WITNESSES.
L. P. Langworthy
R. W. Caston

INVENTOR.
Martin Ransom Kenyon
by Joseph A. Miller
Attorney

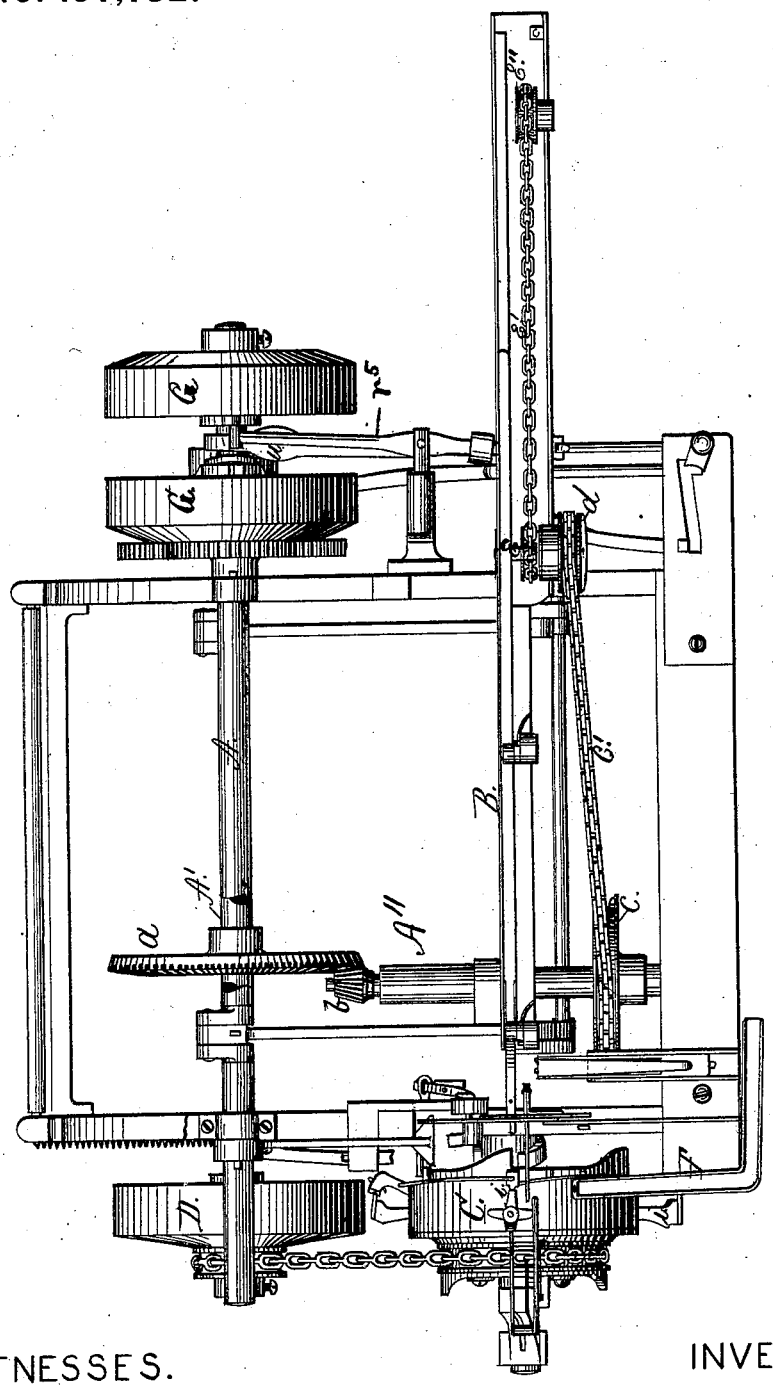

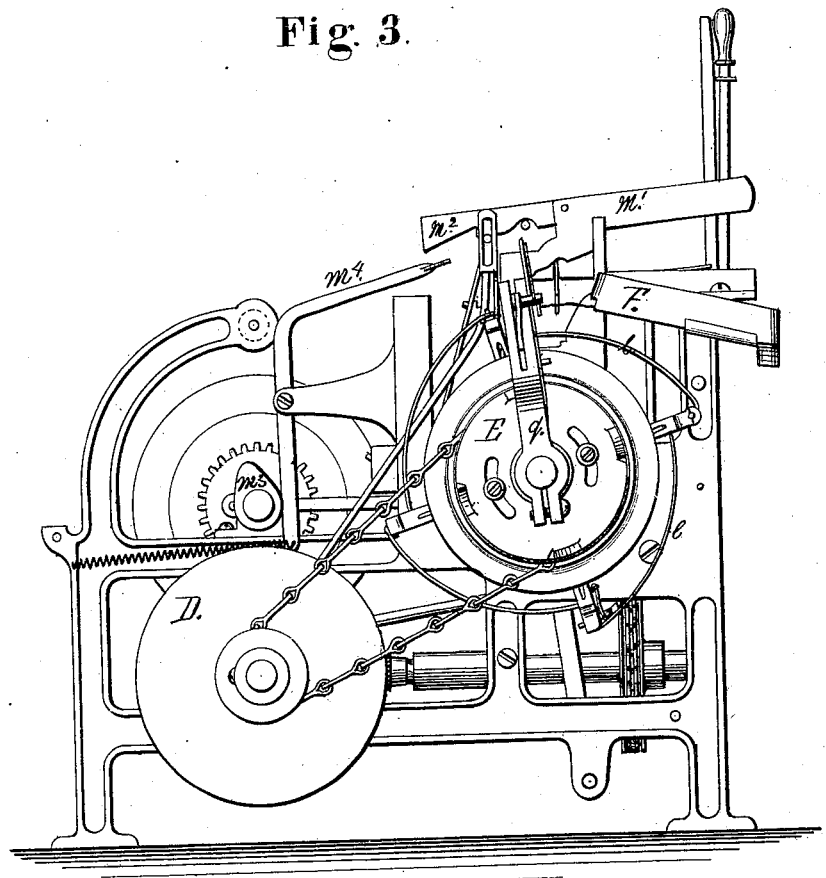

7 Sheets—Sheet 4.
M. R. KENYON.
Loom for Weaving Hair-Cloth.
No. 197,732. Patented Dec. 4, 1877.
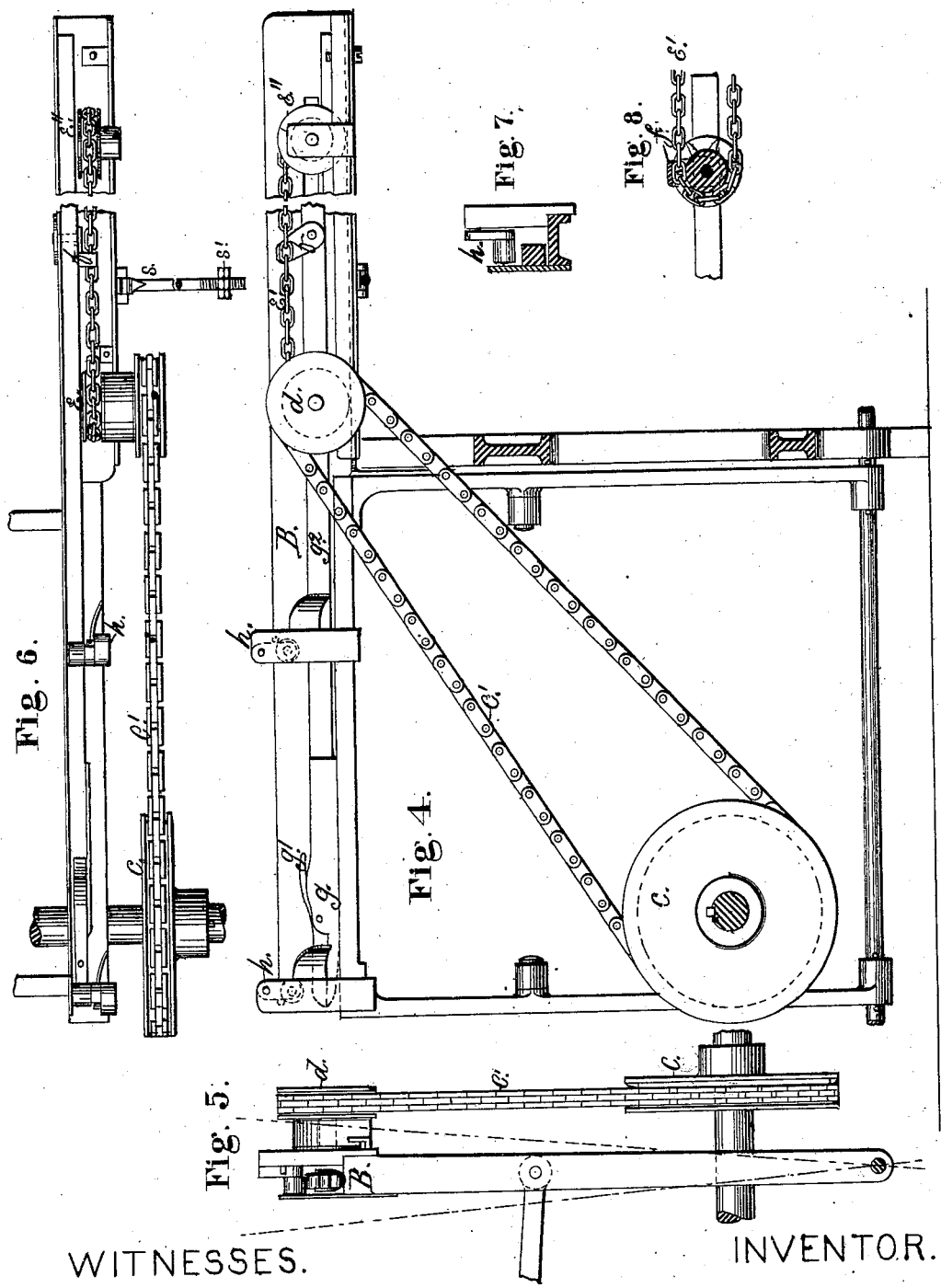
WITNESSES. INVENTOR.

7 Sheets—Sheet 5.

M. R. KENYON.
Loom for Weaving Hair-Cloth.

No. 197,732. Patented Dec. 4, 1877.

Fig. 14.

WITNESSES.

INVENTOR.
Martin Ransom Kenyon
by Joseph A. Miller
Attorney

N. PETERS, PHOTO-LITHOGRAPHER, WASHINGTON, D. C.

M. R. KENYON.
Loom for Weaving Hair-Cloth.
No. 197,732. Patented Dec. 4, 1877.
Fig. 18. Fig. 17.
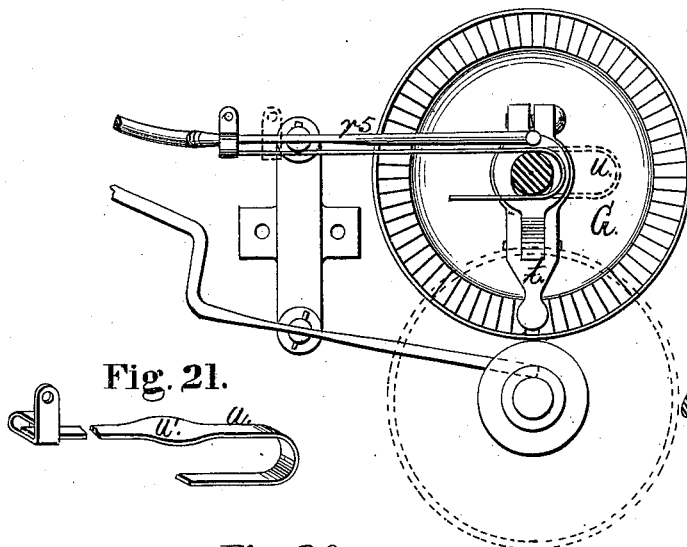
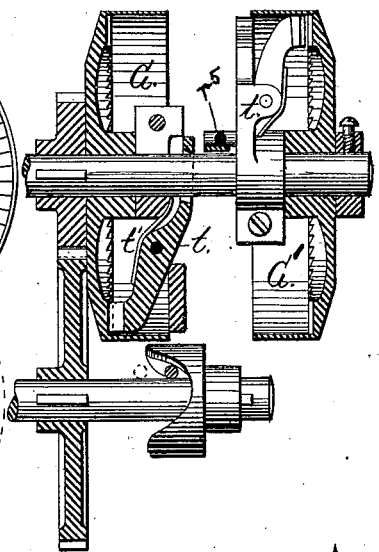
Fig. 21.
Fig. 20. Fig. 22.
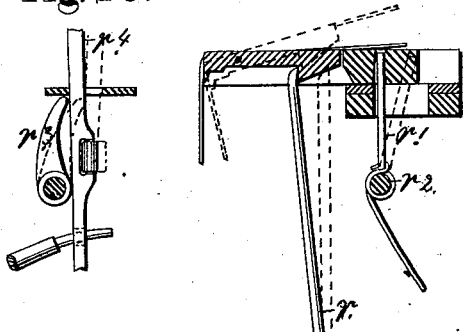
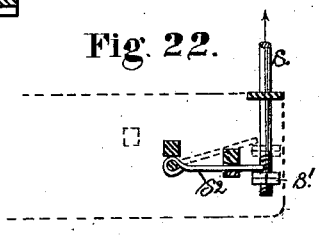
Fig. 23.
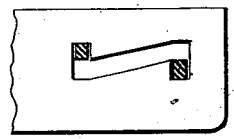
Fig. 19.
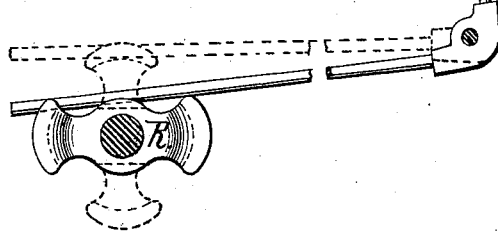
WITNESSES. INVENTOR.
L. P. Langworthy Martin Ransom Kenyon
R. W. Eaton by Joseph A. Miller
Attorney 7 Sheets—Sheet 7.

M. R. KENYON.
Loom for Weaving Hair-Cloth.

No. 197,732. Patented Dec. 4, 1877.

WITNESSES. INVENTOR.
Martin Ransom Kenyon
by Joseph A. Miller
Attorney.

UNITED STATES PATENT OFFICE.

MARTIN R. KENYON, OF PROVIDENCE, RHODE ISLAND.

IMPROVEMENT IN LOOMS FOR WEAVING HAIR-CLOTH.

Specification forming part of Letters Patent No. 197,732, dated December 4, 1877; application filed July 7, 1877.

*To all whom it may concern:*

Be it known that I, MARTIN RANSOM KENYON, of the city and county of Providence, State of Rhode Island, have invented new and useful Improvements in Looms; and I hereby declare that the following is a full, clear, and exact description of the same, which, with the accompanying drawings, forming part of this specification, will enable those skilled in the art to make and use the same.

This invention has reference to that class of looms known in the art as "hair-cloth looms;" and consists in the arrangement of the hinged stops by which the shuttle is opened to receive the hair, and again opened to release the hair after it is laid in the warp; in the peculiar arrangement of the reversing-gear and the automatic means by which, when the shuttle has missed a hair, the motion is reversed and a hair secured; in the improved mechanism for carrying the hair to the shuttle by means of a carrier-drum supplied with pickers, as also in the novel means for controlling the same; in the new arrangement of reciprocating shears for clipping the ends of the hair, and the arrangement of the various parts by which an automatic hair-cloth loom is produced in which every error in the operation of the loom is automatically corrected, as will be more fully set forth hereinafter.

Figure 1:
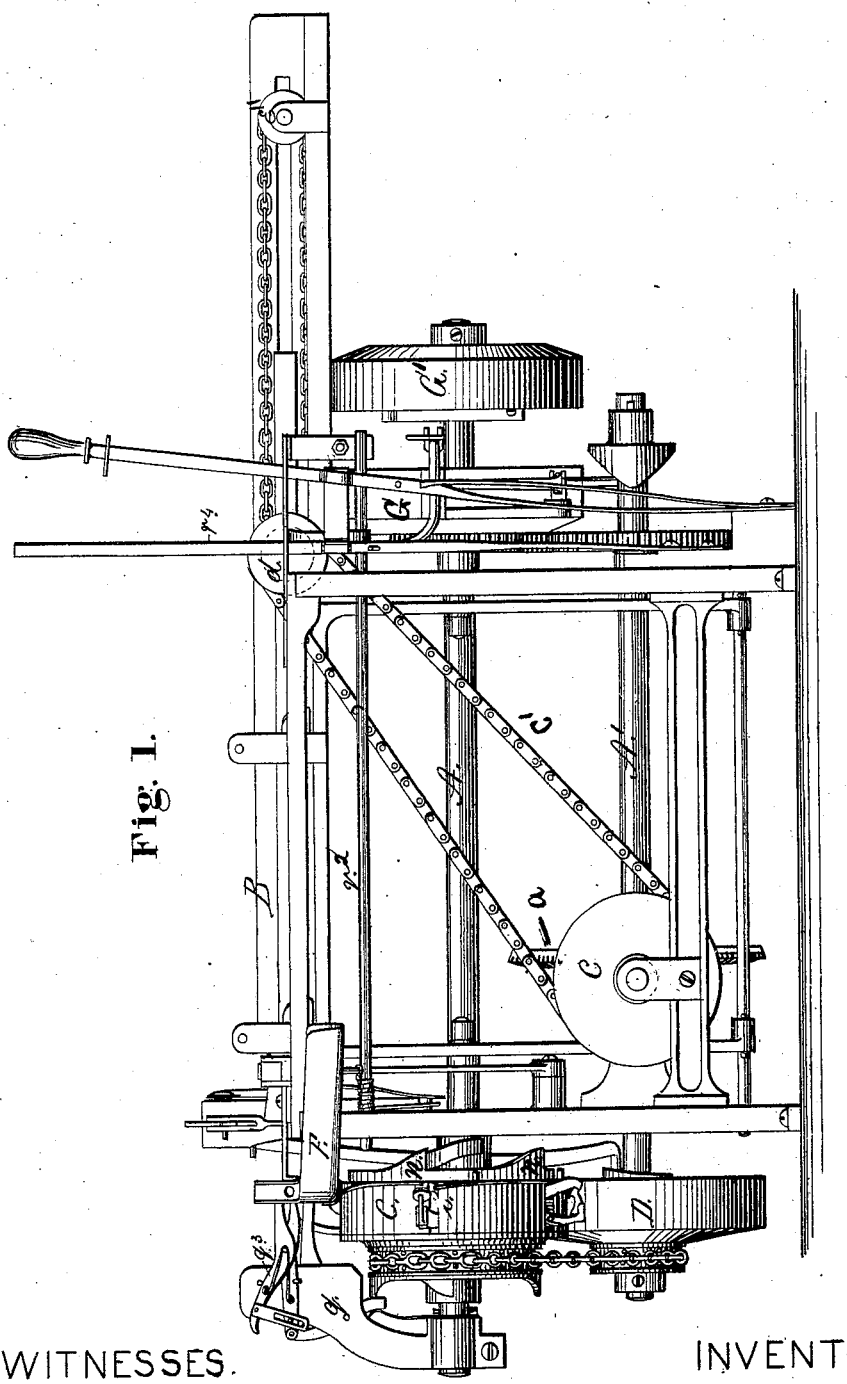
Figure 13:
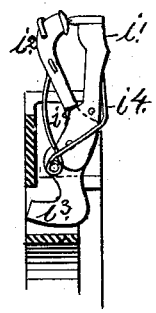
Figure 9:
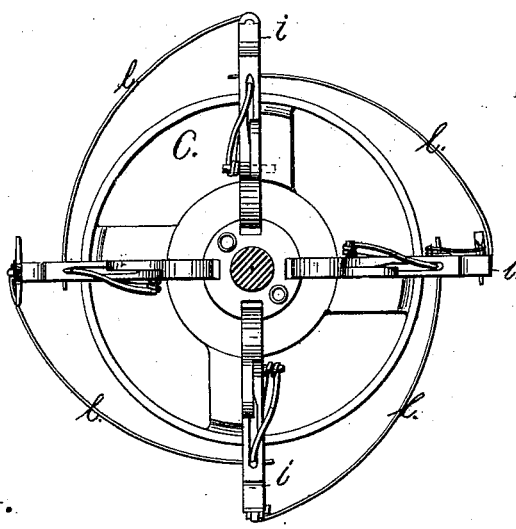
Figure 15:
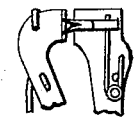
Figure 16:
Figure 12:
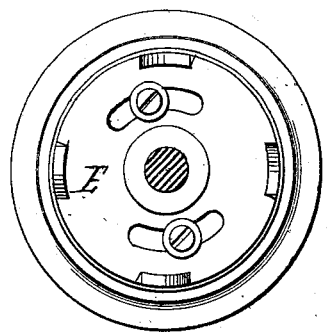
Figure 10:
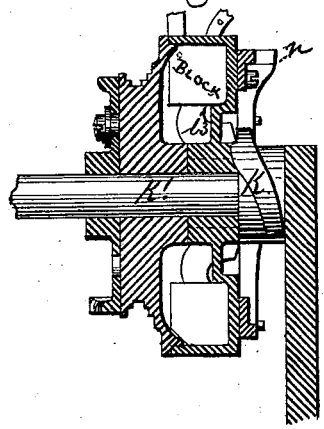
Figure 11:
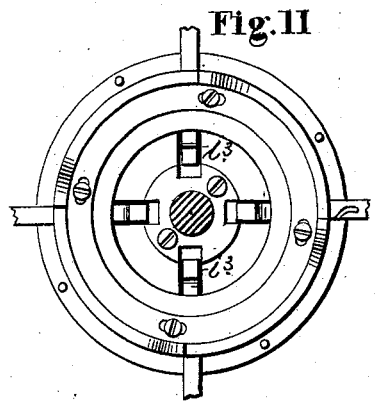
Figure 27:
Figure 28:
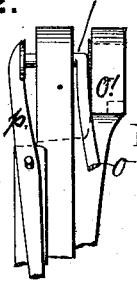
Figure 25:
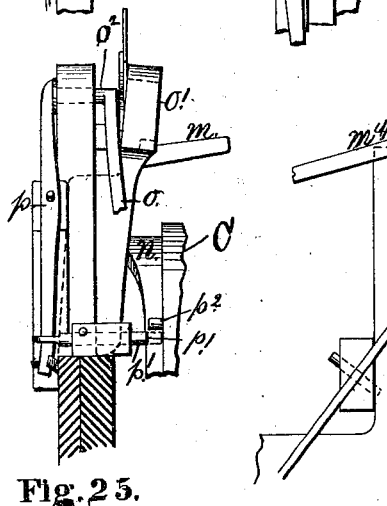
Figure 24:
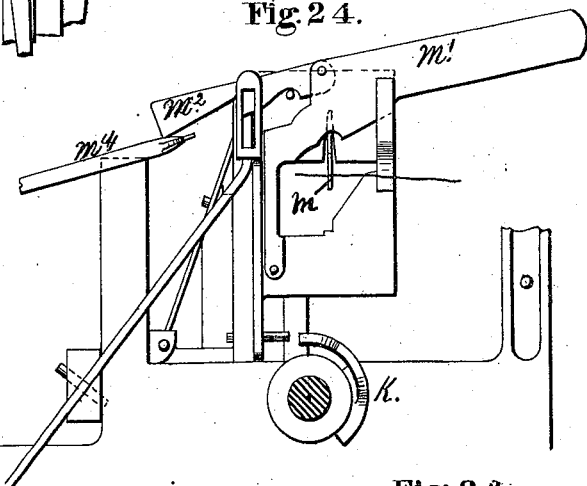
Figure 29:
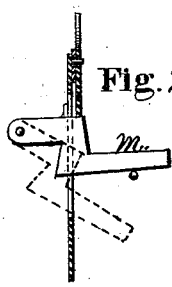
Figure 26:
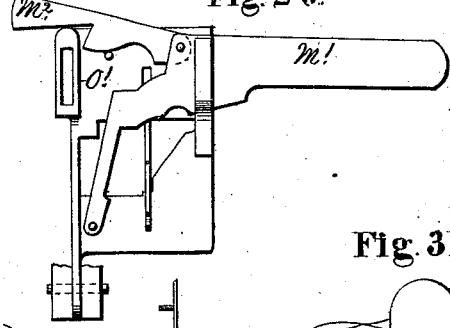
Figures 30, 31, 32:
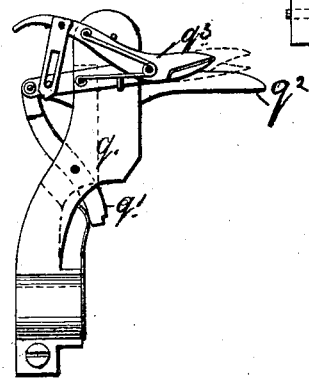

Figure 1 is a front view of my improved loom, showing the various parts at the moment when the shuttle receives the hair. Fig. 2 is a top view of the loom in the same relative position as Fig. 1. Fig. 3 is the end view of the loom where the hair is fed to the shuttle, showing the drum-carrier, the hair-nippers, and the detecter mechanism by which the nippers are controlled. Fig. 4 is an enlarged view, showing the lay and the mechanism for imparting reciprocating motion to the shuttle by reciprocating the shuttle-stick. Fig. 5 is a vertical sectional view of the lay and shuttle-reciprocating mechanism, as also of the means for oscillating the lay. Fig. 6 is a top view of the lay and the shuttle-reciprocating mechanism, also enlarged. Fig. 7 is a section through the lay, showing the hinged stop by which the shuttle is opened. Fig. 8 is a section of the chain-pulley, a portion of the chain, and the pivoted link by which the chain is connected with the shuttle-stick and reciprocating motion is imparted to the shuttle. Fig. 9 is a side view of the carrier-drum, in which the nippers for carrying the hair to the shuttle are secured, showing the springs for holding the nippers, this view being the side of the drum near the loom. Fig. 10 is a sectional view of the carrier-drum vertically through its center, showing the block to which the nippers are secured, as also the lower end of the nipper-arm in contact with the cam by which the same are opened. This cam is in view. Fig. 11 is an interior view of the carrier-drum, showing the position of the nippers, and the heel of the nipper where it comes in contact with the cam, by which the nipper is opened to receive the hair. Fig. 12 is an end view of the carrier-drum, showing the cam-plate and the screws and slots for adjusting the same. Fig. 13 is an enlarged view of one of the nippers, showing the position of the parts, the heel by which, when in contact with the cam, the nipper is opened, and the spring for closing the same. Fig. 14 is an enlarged end view of the nipper, showing the V-shaped groove in one of the nipper-fingers. Fig. 15 represents different views of the oscillating nipper-heads; and Fig. 16, end and side views of the forked nippers, by which the hair is picked and carried to the shuttle. Fig. 17 is an enlarged sectional view of the reversing motion, showing the clutches by which the driving-pulleys are connected with or disconnected from the driving-shaft. Fig. 18 is a view through the center of the reversing motion, showing the pulley provided with ratchet-teeth, the clutch secured to the driving-shaft, and the rods connecting with the shipper-levers. Fig. 19 shows the connection of the weft-fork stop mechanism with the cam on the driving-shaft. Fig. 20 is an enlarged view of the shipper-detaching lever. Fig. 21 is an enlarged view of the spring-arm, provided with a cam, by which the driving-pulleys are detached from the main shaft and the loom is stopped. Fig. 22 is an enlarged horizontal section, showing the shipper-rods, and the detaching-rod secured to the lay, by which the shipper-rod is released. Fig. 23 is a top view of the end of the loom-frame, showing the slot and rests, in which the shipper-rods move. Fig. 24 is an enlarged side view of the stop-motion, by which the nippers in the carrier-drum are controlled in the delivery of the hair, the position indicated being when a hair has been delivered. Fig. 25 is an end view of the stop or controlling mechanism. Fig. 26 is a side view of the same controlling mechanism shown in the position occupied when the hair has been missed and the carrier-drum continues to revolve, bringing another nipper in contact with the hair, until a hair is properly delivered. Figs. 27 and 28 are enlarged views, showing the operation of the stop mechanism on the shipper-rod, by which the carrier-drum is connected with or disconnected from the driving mechanism. Fig. 29 is a view of the hinged hair-detecter operating the controlling mechanism of the carrier-drum. Fig. 30 is a side view of the hair-clipping device, showing the lever by which the same is operated. Fig. 31 is a view of the opposite side of the hair-clipping device; and Fig. 32 is an end view of the same device, showing the clamp by which the same is secured to the stationary shaft on which the carrier-drum revolves.

Similar letters of reference indicate corresponding parts in all the figures.

In the drawings, A is the main driving-shaft, from which power is communicated to the shaft A' by gears, and is provided with two loose pulleys, G G'. Secured to this shaft A' is the bevel-gear $a$, arranged to gear into the beveled pinion $b$, driving a shaft, A'', at right angles with the shaft A'. To the end of said shaft A'' the pulley $c$ is secured, which, by means of the chain $c'$, gives motion to the pulley $d$, secured to a shaft which is secured to the lay B. On the same shaft, and rotating with the pulley $d$, is the chain-pulley $e$, while near the end of the lay is another pulley, $e''$, over which the chain $e'$ is passed. The distance from end to end of the pulleys $e\ e''$ is equal to the length of the reciprocation of the shuttle and shuttle-stick, which is provided with the revolving link $f$, one end of which is secured to the chain and the other journaled on the shuttle-stick, so that as it reaches each end of the reciprocation the end secured to the chain will pass with the chain around the pulleys $e\ e''$, and thus, at the end of each motion, and before the same is changed, the velocity gradually diminishes and is as gradually accelerated, thus producing an even reciprocation of the shuttle without the shock or jar incidental to the usual reciprocating motion.

$g$ represents the shuttle, and consists of two jaws, the lower being fixed and the upper hinged and provided with a spring-pressed trigger, $g^1$, arranged to hold the two jaws firmly together. $g^2$ is the shuttle-stick, by which a positive reciprocating motion is imparted to the shuttle. $h\ h$ are two hinged stops, provided with revolving rollers, which, when they come in contact with the trigger $g^1$, depress the same and open the jaws of the shuttle $g$. The stops $h\ h$ are placed in such position that they will open the shuttle to receive the hair from the carrier, and again open the shuttle when the hair has been laid on the warp, the shuttle closing as soon as the trigger has passed the stop.

C is the carrier-drum, represented enlarged in Figs. 9, 10, 11, and 12. It is supported on a stationary pin or shaft, on which it rotates, and is provided with four or more nippers, arranged to pick the hair from the hair-containing receptacle and carry the same to the shuttle. $i\ i\ i$ in Fig. 9 represent the nipper-heads, pivoted to a block within the carrier-drum, and consist each of two finger-bars, of which $i^1$ is pivoted on a pin near the periphery of the drum, and connected with $i^2$ by a pin farther down, while $i^2$ is also hinged to a block within the carrier-drum, and is provided with a curved end or heel, which rests against the actuating-cam, so that when passing the higher portion of the cam the heel is pushed inward, and both the fingers $i^1$ and $i^2$ separate, while, as soon as the heel end has passed the cam, the spring shown in Fig. 13 presses the fingers $i^1$ and $i^2$ together. The motion of both the nipper-arms is produced by the stationary cam $k$, and thus all the nippers, or as they are sometimes called, "pickers," are operated at the proper time to open and close so as to secure a hair, and in the rotation of the carrier-drum deliver the same to the shuttle.

Figs. 13, 14, 15, and 16 show different modifications of the nipper-heads or fingers relating to the portion which selects and separates the hair, and then firmly holds the same until it is taken up by the shuttle.

The picker in Fig. 13 consists of a pad with a rounded surface, and the picker provided with a V-shaped groove, while Fig. 14 shows a round stud, provided with four or more pickers, also provided with V-shaped grooves in their edges. Fig. 15 exhibits an oscillating spring-pressed trumpet-shaped picker, and Fig. 16 a forked picker, all of which are constructed to facilitate the picking and retaining of the hair.

$l\ l$ are the guide-wires or springs on which the hair-detecter arm is raised so as to slide on the hair secured by the picker, and in the absence of the hair will fall behind the picker-head, and thus cause the carrier-drum to revolve until a hair is properly secured. The pivoted detecter-arm $m$ is shown in Fig. 29, in solid lines, supported on a hair, and in broken lines when no hair is presented; and in Fig. 24 the detecter mechanism is shown in the position occupied when a hair is properly secured. The pivoted arm $m^1$ is then raised by the detecter $m$, and the stop-catch $m^2$ passes between the lever $o$ and the pivoted jaw $o^1$. Secured to the carrier-drum and revolving with the same are as many cams $n$ (see Fig. 25) as there are nippers or pickers, and each of these cams operates the pivoted jaw $o^1$.

When, therefore, a hair is properly secured the cam $n$, operating the pivoted jaw $o^1$, between which and the lever $o$ the stop catch or arm $m^2$ is then inserted, pushes the pin $o^2$, secured to the upper end of the lever $o$, against the pivoted lever $p$, Fig. 25, and the pin $p^1$ is projected so as to interfere with a suitable device on the carrier-drum—such as the pin $p^2$—and thus stop the rotation of the same, while the lever $o$ disengages the clutch, and so disconnects the drum D from the shaft A'. The carrier-drum is now stopped until the shuttle has carried the hair forward, when the cam $m^3$, on the shaft A, (see Fig. 3,) operates the pivoted lever $m^4$, as shown in Fig. 24, raises the stop-catch $m^2$, and releases the stop-pin $p^1$, and connects the drum D again with the shaft A'. As often as the picker takes a hair and the hair is taken by the shuttle so often will these motions be performed.

When the picker misses a hair, and the stop-catch $m^2$ is not inserted between the lever $o$ and the hinged jaw $o^1$, the cam $n$ will operate the hinged jaw $o^1$, but the lever $o$ will pass into the slot provided in the jaw $o^1$, and the carrier-drum will revolve, presenting picker after picker until a hair is properly secured.

To facilitate the picking of the hair from the receptacle F it is necessary that the ends of the hair should be kept even, and as some ends will creep out beyond the others a clipping device must be provided. Fig. 12 represents the end of the carrier-drum to which the cam-plate E is secured and properly adjusted. This cam-plate E is provided with as many cams as there are pickers, and as each cam passes the heel of the hinged lever $q^1$, (see Fig. 30,) the guard $q^2$ and the shears $q^3$ are brought forward, and as the arms of the shears pass between two studs secured to the standard $q$, the shears are opened, and in withdrawing, as the heel of the hinged lever passes beyond the cam suddenly, the projecting hairs are clipped even.

If every picker would deliver a hair, and the shuttle take up the hair each time, the loom would require but little mechanism; but as some picker will, from time to time, miss a hair, and the shuttle also fail to take the same, some mechanism is required to compel the shuttle to return until a hair is finally secured, and, also, during this time to partially stop the lay and the harnesses from shifting the warp. To accomplish this a peculiar reversing-gear is arranged, and operated through a weft-fork, so that when a hair is missed the motion of the shuttle is reversed, and it returns to the carrier-drum to take, or attempt to take, a hair, and until the hair is properly received by the shuttle, the shuttle is made to reciprocate near the end of the lay, whereas, as soon as the hair is properly secured, the shuttle will continue and lay the hair between the warp.

The weft-fork is shown in Fig. 19, both in solid and broken lines. When the shuttle passes the weft-fork without a hair, the same is left in the position shown in solid lines, and the cam R, in its revolution, vibrates the lever $r$, and pushing back the slide containing the weft-fork partially turns the arm $r^1$, secured to the shaft $r^2$, to the other end of which the arm $r^3$ is secured, and this disengages the shipper-rod $r^4$, which, being connected by means of the pivoted lever $r^5$, operates to release the pivoted clutch $t$ from the ratchet-teeth formed on the inside of the driving-pulley G, which latter is loosely mounted upon the driving-shaft, and at the same time throws the opposite and correspondingly-constructed clutch $t$ into engagement with the teeth formed on the inner surface of the reversing-pulley G', and thus reverses the reciprocating motion of the shuttle and returns the same, so as to secure a hair.

This reversing mechanism is more fully described as follows: The two pulleys G G' are loosely mounted upon the driving-shaft, and are driven in opposite directions by reversely-driven belts. These pulleys are each provided with annular-face ratchet-plates, with the teeth of which the clutches $t$ are made to engage by means of springs $t'$. Clutches $t$ are pivoted within frames secured to the driving-shaft. The rear end of each clutch is provided with a ring which surrounds the driving-shaft. As the shipping-lever $r^5$ is forced against the ring of either clutch it operates to disengage said clutch from the ratchet of the pulley, and also allows the opposite clutch to lock the pulley to the driving-shaft.

It will thus be understood that the shipping-lever $r^5$, when moved in a lateral direction, serves to engage and disengage the clutch $t$, thereby releasing one of the driving-pulleys and locking the other to the driving-shaft. The lay, in reciprocating, detaches, by means of the rod $s$, Fig. 22, secured to the same, and provided with a projecting head, $s^1$, coming in contact with the hinged slide $s^2$, the reversing-lever, and both levers return to their first position by means of suitable springs, so that as soon as the shuttle reaches the end of its reciprocation the driving-pulley is again secured to the shaft A; and when now a hair is secured, the hair, coming in contact with the weft-fork, raises the same, and the lever $r$ is allowed to vibrate without interfering with the shaft $r^2$. The hair is laid between the warps and the operation continued until either the pickers or the shuttle miss a hair, when the reversing-gears are again thrown into action.

When the loom is to be stopped the spring-clutch $u$ (shown in Figs. 18 and 21) is pushed between the clutches $t$ $t$, and thus both clutches and the pulleys are released, and the latter turn loosely on the shaft.

The loom, when in operation, is entirely automatic, and every defective operation is at once corrected by suitable mechanism. When all parts are properly adjusted hair is placed in the receptacle F and the clutches $t$ $t$ released, the carrier-drum, provided with pickers or nippers, revolves, the pickers carry the hair forward, and the shuttle approaches the hair and carries the same into or between the warps; the harness is sprung, a new shed opened, and the shuttle advances to receive another hair, and so proceeds. If, however, one picker misses a hair the detecter-arm $m$ suddenly falls behind the picker, and as the cam $n$ vibrates the jaw $o^1$ without affecting the stop mechanism, the carrier-drum continues to revolve and present picker after picker until a hair is secured; and if, by the time the shuttle arrives to take a hair, a hair has been secured the shuttle will continue its regular work; if, however, no hair has been secured the pivoted vibrating lever $r$ will at once act upon the reversing mechanism described, and reverse the motion of the shuttle, and this will continue until a hair has been properly secured and laid in the warp.

By thus arranging a hair-cloth loom to be entirely automatic much time and labor are saved, and the cost of manufacture reduced.

Having thus described my invention, I claim as new and desire to secure by Letters Patent—

1. The combination, with the hair-receptacle F, of the rotary carrier-drum C, provided with the pickers $i$ $i$ and stationary cam $k$, and adapted to pick the hair from the receptacle and present the same to the shuttle, substantially as described.

2. The combination, with the rotary carrier-drum C, provided with the cams $n$ $n$, of the stopping mechanism, substantially as described, whereby the carrier is stopped when a hair has been caught by a nipper, substantially as described.

3. The combination, with the rotary carrier-drum C and pickers $i$ $i$, of the wires $l$ $l$, detecter-arm M, and stopping mechanism, said wires being adapted to guide the detecter-arm onto the hair, substantially as set forth.

4. The combination, with the picker-arm $i^2$, pivoted to the rotary carrier-drum, and provided with the heel $i^3$ and the picker-arm $i^1$, hinged in the drum and connected with the arm $i^2$, of the stationary cam $k$, whereby both picker-arms may be opened and closed simultaneously under the action of the stationary cam $k$, substantially as set forth.

5. The combination, with the cam $n$ secured to the rotary carrier-drum C, of the pivoted jaw $o^1$, the lever $o$, and stop-lever $p$, and detecter-arm $m$, adapted to stop the revolution of the carrier-drum when a hair is secured, substantially as set forth.

6. The combination, with the rotary carrier-drum, provided with guide-wires, of the detecter-arm $m$, the pivoted arm $m^1$, and stop $m^2$, and mechanism, substantially as described, whereby the clutch of the driving-pulley is disconnected, substantially as set forth.

7. The combination, with the rotary carrier-drum C, provided with the adjustable cam-plate E, of the standard $q$ and pivoted lever $q^1$, the guide $q^2$, and shears $q^3$, arranged to clip the hair, substantially as and for the purpose described.

8. The combination, with the detecter stop mechanism, consisting of the arm $m$, the hinged arm $m^1$, and stop $m^2$, of the revolving cam $m^3$ and vibrating arm $m^4$, adapted to release the detecter stop mechanism, substantially as and for the purpose specified.

9. In a hair-loom, the combination of the following instrumentalities: a reciprocating shuttle, provided with a pivoted spring-pressed jaw and mechanism adapted to open said jaw, a revolving carrier-drum, provided with pickers adapted to present the hair to the shuttle, and a detecter stop mechanism adapted to control the operating mechanism of the rotary carrier-drum, whereby the same will revolve until a picker has delivered a hair, and stop as soon as the hair is delivered, substantially as set forth.

10. The combination, with two drums loosely secured to the driving-shaft, each drum constructed with an annular-face ratchet on its inner side, of two spring-pressed clutches and an intermediate lever, substantially as set forth.

11. The combination, with the lay B, of the detaching mechanism, consisting of the rod $s$, projecting head $s^1$, and pivoted slide $s^2$, adapted to detach the shipper-rod by the reciprocation of the lay, substantially as and for the purpose set forth.

12. In a hair-loom, the combination, with the reciprocating shuttle, of the rotary carrier-drum, provided with any required number of pickers, and a reversing mechanism, substantially as described, operated through the weft-fork when a hair is missed, and adapted to reverse the motion of the shuttle, substantially as and for the purpose specified.

MARTIN R. KENYON.

Witnesses:
JOSEPH A. MILLER,
JOSEPH A. MILLER, Jr.